United States Patent
Okusawa et al.

[19]

[11] Patent Number: 6,058,856
[45] Date of Patent: May 9, 2000

[54] WASTE PROCESSING SYSTEM AND FUEL REFORMER USED IN THE WASTE PROCESSING SYSTEM

[75] Inventors: Tsutomu Okusawa; Kazuhito Koyama; Masahiko Yamagishi; Shigeo Hatamiya; Taiko Ajiro, all of Hitachi; Megumi Sunou, Toukai; Yukio Ishigaki, Hitachi; Kenji Tokunaga, Tokyo, all of Japan

[73] Assignee: Hitachi, Ltd., Tokyo, Japan

[21] Appl. No.: 09/053,136

[22] Filed: Apr. 1, 1998

Related U.S. Application Data

[63] Continuation-in-part of application No. 08/959,026, Oct. 28, 1997.

[51] Int. Cl.$^7$ .............................. F23B 7/00; F02B 43/00; F02C 7/08
[52] U.S. Cl. .................. 110/233; 110/342; 110/344; 110/346; 60/39.12; 60/39.5
[58] Field of Search ............................. 60/39.12, 39.182, 60/39.55, 39.5; 110/233, 346, 348, 347, 342, 344, 229

[56] References Cited

FOREIGN PATENT DOCUMENTS

| | | |
|---|---|---|
| 2-286835 | 11/1990 | Japan . |
| 5-332166 | 12/1993 | Japan . |
| 5-332167 | 12/1993 | Japan . |

*Primary Examiner*—Ira S. Lazarus
*Assistant Examiner*—Ljiljana V. Ciric
*Attorney, Agent, or Firm*—Beall Law Offices

[57] ABSTRACT

A waste-to-energy incineration system, in which the amount and the heat value of exhaust gas changes during operation, includes an incinerator for burning waste, a boiler in the incinerator for generating steam with exhaust heat generated by the incinerator, and a superheater for superheating steam generated in the boiler. A steam turbine is provided which is driven by steam superheated by the superheater and a generator is driven by the steam turbine. A fuel reformer is provided for reforming source fuel. A combustor burning fuel gas reformed by the fuel reformer and at least a part of exhaust gas fed from the incinerator is provided which decomposes generated dioxin in waste incineration exhaust gas.

5 Claims, 9 Drawing Sheets

WASTE PROCESSING SYSTEM AND FUEL REFORMER USED IN THE WASTE PROCESSING SYSTEM

This application is a continuation-in-part of application Ser. No. 08/959,026, filed Oct. 28, 1997.

BACKGROUND OF THE INVENTION

1. Field of the Invention

The present invention relates to a fuel reformer and a waste processing system including a fuel reformer, and more particularly to a direct heat exchange type, non-catalyst fuel reformer, and a waste-to-energy incineration system in which a direct heat exchange type, non-catalyst fuel reformer is utilized.

2. Description of Related Art

As a fuel reformer for reforming source fuel such as hydrocarbon material to a gas containing hydrogen, an indirect heat exchange type fuel reformer or a direct heat exchange type reformer after has been used. Further, there are two types of fuel reformers, that is, a fuel reformer using a catalyst and a fuel reformer which does not use a catalyst.

In an indirect heat exchange type fuel reformer, a reaction tube and a burner are provided. While the reaction tube is heated by the combustion gas from the burner, raw gas enters the reaction tube at an end of the reaction tube. Further, the raw gas is partially oxidized (so-called partial combustion), and reformed to a gas including hydrogen, either by using a catalyst or by using coolant steam on a basis of hydrothermal reaction.

On the other hand, in a direct heat exchange type fuel reformer, the heat required for reforming raw fuel is directly provided to raw fuel flowing in a fuel flowing path by partial oxidization, which results in a high temperature gas of raw fuel. The high temperature raw fuel (hereafter referred to as fuel for simplicity) is reformed to gas including hydrogen, either by using a catalyst or by using a steam coolant on a basis of hydrothermal reaction. In a chemical industrial plant, a direct heat exchange type reformer is mainly used.

In the method of using a catalyst, since the catalyst can lower the reforming energy, that is, the reforming temperature, to about 700° C., only 20% of the fuel is consumed for partial oxidization.

In the method of using no catalyst, due to the absence of a catalytic energy saving effect, more than 20% of the fuel is required for partial oxidization in order to obtain the reforming energy, that is, the reforming temperature, as high as 1300° C.

One of the features of the waste-to-energy incineration system is that the generated heat changes due to changes in the amount of waste to be processed, and further depends on the day, the season or the year, and waste processing. Further, since the waste processing to be carried out must be performed without stopping operation a maintenance-free composition or structure is required for the waste-to-energy incineration system. For satisfying the above-mentioned requirement, each apparatus composing the system should be composed of parts which are long lasting. To achieve the above-mentioned apparatus, the method in which a catalyst is not used, is advantageous. However, in this method, it is indispensable to produce energy necessary for reforming fuel gas by partially oxidizing more than 20% of the fuel in order to reform fuel gas with the partial oxidization heat itself of the fuel gas. (Hereafter, a fuel reformer mainly indicates a fuel reformer without a catalyst, in which more than 20% of the fuel is partially oxidized.)

An existing fuel reformer has been used, for example, in a gas turbine power generation system. Further, a power generation system in which a fuel reformer is provided, is disclosed in JP-A-286835/1990, JP-A-332166/1993 and JP-A332167/1993.

Since the previously-mentioned indirect heat exchange type fuel reformer includes a burner for heating a reaction tube, such a fuel reformer has a problem in that the size of the apparatus is large, and an external heat source has to be provided.

On the other hand, a direct heat exchange type fuel reformer is superior to an indirect heat exchange type fuel reformer in the point that the fuel itself produces a heat source for reforming a fuel gas by partially oxidizing the fuel. In addition, due to the absence of a burner and a reaction tube, the size of the fuel reformer can be reduced in comparison with the indirect heat exchange type.

One objective of a waste-to-energy incineration system is to burn waste and decrease the volume of waste, without polluting the environment. Another object is to generate power by utilizing the heat generated in burning waste. Therefore, it is very important to remove hazardous material from exhaust gas generated in an incinerator. In particular, removal of dioxin has been a problem.

The apparatus as disclosed in JP-A-286835/1990, JP-A-332166/1993 and JP-A-332167/1993 are mainly used for a gas turbine power generation system. The above-mentioned subject is out of the question with these devices because of using fuel different from the waste. Therefore, the conventional reformers are not based on the same subject matter. Further, since various kinds of waste are burned in an incinerator, the amount of generated heat changes over time. Consequently, since the amount of fuel fed to a fuel reformer changes, corresponding to the amount and the components of gas exhausted from the incinerator, the existing direct heat exchange type fuel reformers have a problem in that a fire-proofing brick structure part inside the incinerator is easily damaged and worn out due to the changes in the generated heat.

SUMMARY OF THE INVENTION

The present invention is intended to solve the above-mentioned problems, and the objectives of the present invention are as follows.

A first objective of the present invention is to provide a waste-to-energy incineration system which is able to stably decompose generated dioxin, and in which the composition and the heat value of the exhaust gas fluctuate over time, and which utilizes a fuel reformer.

A second objective of the present invention is to provide a waste-to-energy incineration system and a fuel reformer which are able to stably decompose generated dioxin to suppress NOx generation.

A third objective of the present invention is to provide a waste-to-energy incineration system having a highly reliable performance with respect to dioxin decomposition and a highly efficient waste-to-energy incineration performance.

To attain the above-mentioned first and third objectives, the present invention provides a waste-to-energy incineration system, comprising:

an incinerator for burning waste;

a boiler in the incinerator for generating steam by using exhaust heat generated by the incinerator;

a superheater for superheating steam generated in the boiler;

a steam turbine driven by steam superheated by the superheater;

a generator driven by the steam turbine;

a fuel reformer for reforming fuel; and a combustor burning fuel gas which is reformed by the fuel reformer, and at least a part of an incinerator exhaust gas.

Further, in a waste-to-energy incinerator system, the system comprises:

an incinerator for burning waste;

a boiler in the incinerator for generating steam with exhaust heat generated in the incinerator;

a steam utilizer for utilizing steam generated in the boiler; and a fuel reformer for reforming fuel;

wherein fuel gas reformed by said fuel reformer is led to said incinerator.

Further, in a waste-to-energy incineration system, the system comprises:

an incinerator for burning waste;

a first boiler in the incinerator for generating steam with exhaust heat generated in the incinerator;

a steam utilizer for utilizing steam generated in the boiler;

a second boiler different from the first boiler;

a fuel reformer for reforming fuel; and a combustor for burning fuel gas which is reformed by the reformer, and at least a part of an incinerator exhaust gas;

wherein steam generated by the second boiler is led to the fuel reformer.

To attain the above-mentioned second objective, the present invention provides a waste-to-energy incineration system, comprising:

an incinerator for burning waste;

a boiler in the incinerator for generating steam by using exhaust heat generated in the incinerator;

a superheater for reheating steam generated in the boiler;

a steam turbine driven by steam led from the superheater;

a generator driven by the steam turbine;

a fuel reformer for partially oxidizing more than 20% of a source fuel; and a combustor for burning fuel gas which is reformed by the fuel reformer, and at least a part of an incinerator exhaust gas.

In the above-mentioned waste-to-energy incineration systems, steam extracted from a steam feed-water system consisting of the incinerator boiler, the superheater, and the steam turbine or the steam utilizer is used as a cooling medium injected in the fuel reformer. Further, at a place in the steam feed-water system, a feed-water evaporator utilizing exhaust gas from the combustor as a heat source is provided, and steam generated from water heated by the feed-water evaporator is used as a cooling medium injected in the fuel reformer.

Further, the above-mentioned fuel reformer includes a first chamber for reforming fuel and a second chamber adjacent the first chamber and outside of the first chamber, for leading steam as a cooling medium into the first chamber.

Further, in the first chamber, a fuel reforming reaction heat source is obtained by partially oxidizing a source fuel and the source fuel is reformed. Further, the fuel reformer includes a fuel flowing path for generating the fuel reforming reaction heat source and reforming the heat source (referred to as a fuel flowing chamber) and a cooling jacket. In the fuel flowing chamber, fuel gas is obtained by partially oxidizing more than 20% of a raw fuel, and the source fuel is reformed. Further, the cooling jacket is arranged, adjacent the fuel flowing chamber and outside of the fuel flowing chamber, for leading steam as a cooling medium from at least one hole or a tube into the fuel flowing chamber. Furthermore, the fuel flowing chamber is composed of sub-chambers having different sectional areas. Moreover, the first chamber has a swirling means for generating a swirling flow of the cooling medium.

The above-mentioned fuel reformer includes a source fuel feeding means, a cooling medium feeding means, a first chamber for generating a fuel reforming reaction heat source and reforming the source fuel, and a second chamber arranged adjacent the first chamber and outside of the first chamber, for leading a cooling medium fed by the cooling medium feeding means into the first chamber.

Further, the above-mentioned fuel reformer includes a source fuel feeding means, a cooling medium feeding means, a fuel flowing chamber for generating a fuel reforming reaction heat source and reforming the source fuel, a cooling jacket arranged adjacent the fuel flowing chamber, for leading steam as a cooling medium fed by the cooling medium feeding means from at least one place into the fuel flowing chamber, wherein more than 20% of a source fuel is partially oxidized.

Furthermore, the above-mentioned fuel flowing chamber is composed of parts having different sectional areas.

Moreover, the first chamber has a swirling means for generating a swirling flow of the cooling medium.

To attain the above-mentioned second objective, the present invention provides a waste-to-energy incineration system, wherein a part of an exhaust gas generated in the incinerator is led to the fuel reformer as an oxidizer together with air or oxygen. Further, at least a part of the exhaust gas generated in the incinerator is led to the combustor as an oxidizer together with air or oxygen.

To attain the above-mentioned third objective, the present invention provides a waste incineration processing system comprising:

an incinerator for burning waste;

a boiler in the incinerator, for generating steam with exhaust heat generated in the incinerator;

a steam utilizer utilizing steam generating in the boiler; and a fuel reformer;

wherein fuel reformed by the fuel reformer is injected into the incinerator and burned.

Moreover, the present invention includes a waste incineration processing system, comprising:

an incinerator for burning waste;

a boiler for generating steam;

a fuel reformer for reforming fuel; and a combustor for burning fuel gas which is reformed by the fuel reformer, and at least a part of an incinerator exhaust gas;

wherein steam generated in the boiler is led into the fuel reformer.

Further, the present invention includes a waste incineration processing system including having a waste incineration plant with an incinerator for burning waste, a dust collector for collecting dust in a burned-up waste exhaust gas sent from the incinerator, and an exhaust gas stack for discharging the burned-up waste gas which is passed through the dust collector, the waste incineration processing system comprising:

a fuel reformer for changing source fuel to reformed fuel including hydrogen; and a combustor for burning the reformed fuel fed from the reformer together with the burned-up waste gas which passes through the dust collector, and is branched and fed to the combustor.

Furthermore, it is preferable that the waste incineration processing system further includes a superheater, heating the burned-up waste exhaust gas to be fed to the combustor, as a heat source.

DETAILED DESCRIPTION OF THE PREFERRED EMBODIMENTS

Figure 1:
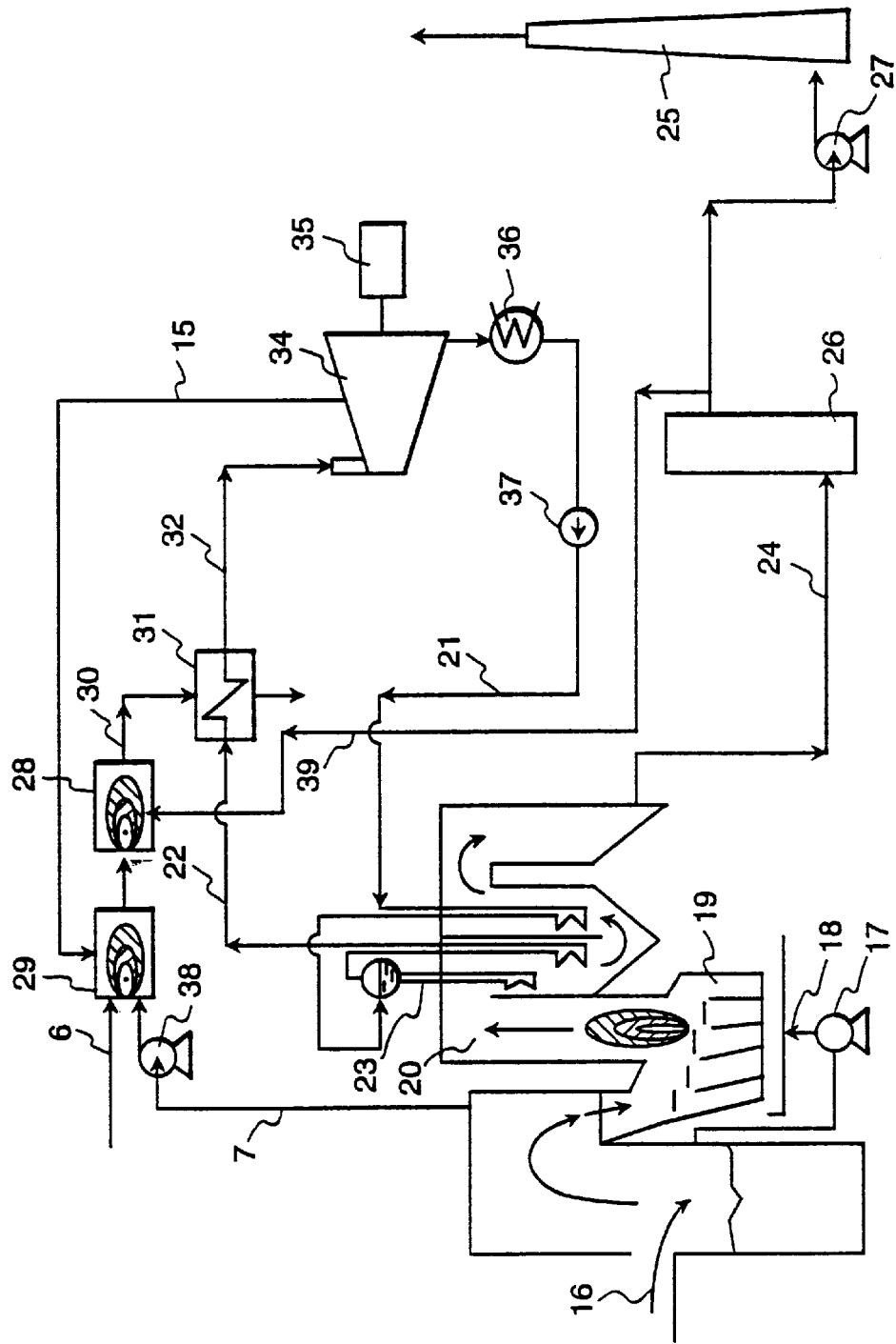
FIG. 1 is a system diagram of a waste-to-energy incineration system of an embodiment of the present invention.
Figure 2:
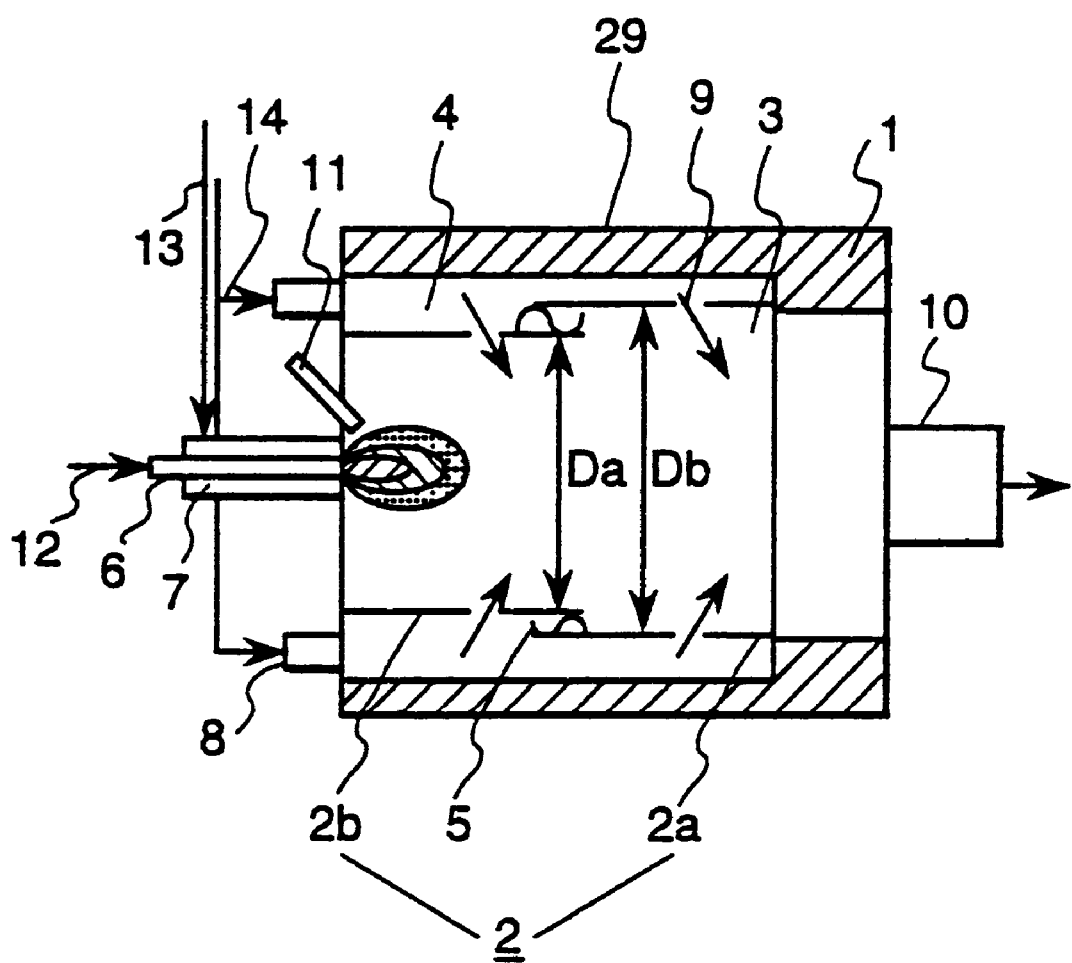
FIG. 2 is a vertical sectional view of a fuel reformer of the embodiment of FIG. 1.
Figure 8:
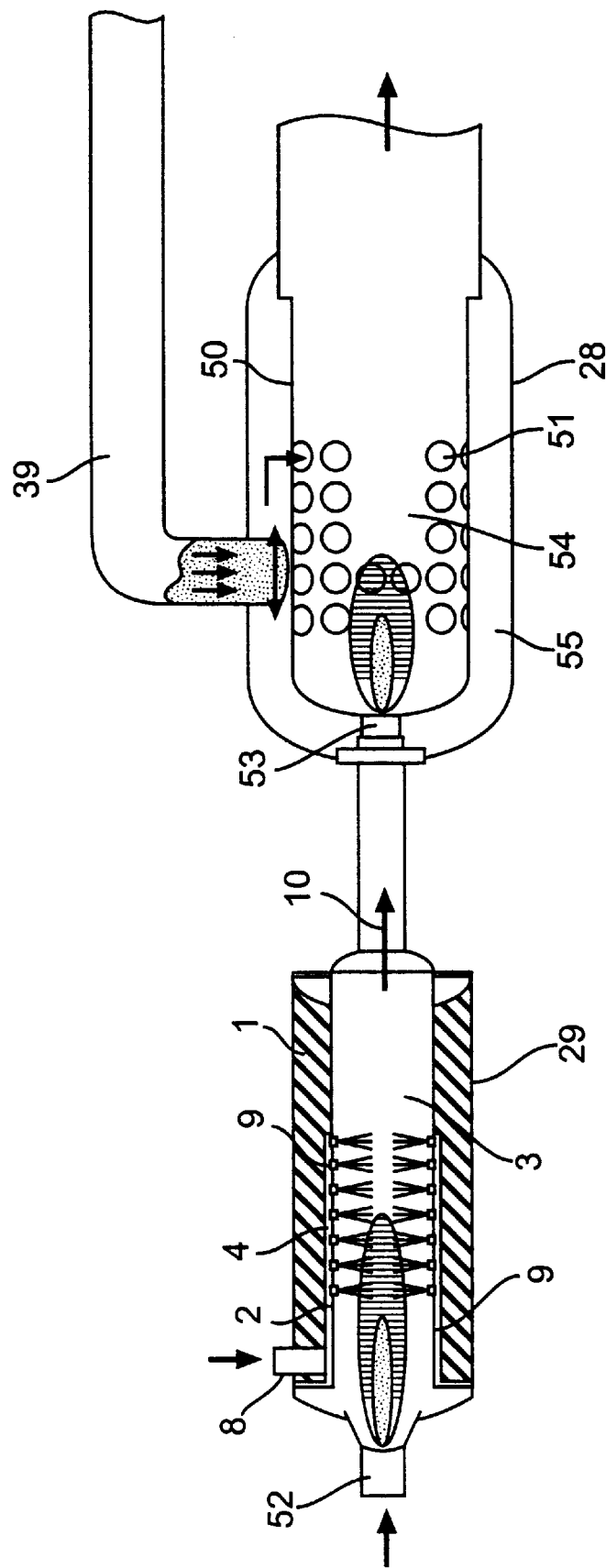
FIG. 8 is a vertical cross section view of a reformer and a combustor of yet another embodiment of the present invention.

At first, details of the present invention will be explained with reference to an embodiment shown in FIG. 1–FIG. 4. FIG. 1 is a system diagram of a waste-to-energy incineration system of an embodiment according to the present invention, and FIG. 2 is a vertical sectional view of a fuel reformer of the embodiment of FIG. 1. In each of FIG. 3 and FIG. 4, variations of the waste-to-energy incineration system shown in FIG. 1, are shown. FIG. 8 is a vertical cross section view of a fuel reformer and a combustor of another embodiment.

As shown in FIG. 1, the waste-to-energy incineration system is divided into two main systems, that is, a steam turbine system and an exhaust gas system including a fuel reformer. In an incinerator 19, a part for storing waste 16 is provided, and air is injected into the incinerator 19 through the part for storing waste 16 by a compressor fan 17. The air injected into the incinerator 19 is used as waste burning air. The burned waste gas 20 generated in the incinerator is sent to a dust collector 26 via an exhaust gas pipe 24 after flowing through an incinerator boiler 23.

An air feeding pipe 7 for feeding air to a fuel reformer 29 is provided at the part for storing waste 16 and is connected to a fuel reformer 29 to which a fuel feeding pipe 6 is connected. Downstream of the fuel reformer 29, a combustor 28 is connected to the fuel reformer 29. Further, the downstream of the combustor 28 is connected to a superheater 31 by a burned-up waste exhaust gas pipe 30. Steam passes through the superheater 31, and flows into a steam turbine 34 via superheated steam pipe 32. A generator 35 connected to the steam turbine 34 is rotatably driven by the rotation of the steam turbine by the superheated steam passing through the superheated steam pipe 32, and the rotated generator 35 generates electrical power. A part of the steam flowing in the steam turbine 34 and rotating the turbine 34 is extracted and fed back to the fuel reformer 29 through a pipe 15. The rest of the steam is led to a condenser 36 after rotating the steam turbine 34 and is condensed to water. The condensed water is fed to the incinerator boiler 23 by a feed water pump 37 via a feed water pipe 21.

Further, dust in the burned-up waste gas 20 sent to the dust collector 26 is collected by the dust collector 26. A part or the whole of the burned-up waste gas 20 is fed to the combustor 28 after passing through the dust collector 26. The rest of the gas is sent to an exhaust gas stack 25 by an induction fan 27, and is discharged from the stack 25.

The composition of the fuel reformer is shown in FIG. 2. The outside of the cylindrical fuel reformer 29 is covered by an insulator layer 1, and a fuel flowing chamber 3 surrounded by cylindrical partitions 2a and 2b in the central line axis direction is provided. The insulator layer 1 is provided to prevent heat from dissipating, for example, by radiating from the fuel reformer 29. The insulator layer 1 may be comprised of a heat insulation material such as glass wool, ceramic wool, etc. The cylindrical partitions 2a and 2b are composed of two different diameter parts. A cooling jacket 4 is provided inside of the insulation layer and outside of the partitions. The partitions 2a and 2b can be freely expanded and contracted in the horizontal direction by inserting a spacer 5 between the two partitions 2a and 2b.

Further, the fuel feeding pipe 6 and the air feeding pipe 7 are provided in the vicinity of the central axis part in the upper stream portion of the fuel flowing chamber 3, and these pipes form an entrance from which a fuel-steam mixture gas is injected into the fuel flowing chamber 3. The gas injected into the fuel flowing chamber 3 is ignited by an ignitor 11. A cooling medium, namely, cooling steam is provided through feeding pipe 8 in the upper stream portion of the cooling jacket 4. Further, a plurality of injection holes 9 are provided in the partitions 2a and 2b so that the cooling steam entering the cooling jacket 4 is injected into the fuel flowing chamber 3. As shown by the slanted arrows in the injection holes 9, the holes 9 are slanted at an angle to a central axis of the fuel reformer whereby a swirling flow of the cooling medium is created in the fuel flowing chamber 3 of the fuel reformer as the cooling medium is injected therein. Furthermore, a fuel exit 10 for ejecting the fuel gas including hydrogen, reformed fuel, is provided in the downstream, and is connected to the combustor 28 as mentioned above.

In the following, operation of the fuel reformer 29 having the above-mentioned construction is explained. A mixture gas 12 of a fuel such as a hydrocarbon (heavy oil is used as the fuel in this embodiment) mixed with steam at a predetermined ratio is fed to the fuel flowing chamber 3 via the fuel feeding pipe 6, and air 13 is fed to the fuel flowing chamber 3 via the air feeding pipe 7. Further, the mixture gas 12 and the air 13 are ignited by the ignitor 11, and a diffused combustion is generated and continued. The flow rate of the air 13 fed to the fuel flowing chamber 3 via the air feeding pipe 7 is adjusted so as to burn more than 20% of the mixture gas 12 (gas obtained by evaporating heavy oil used as fuel) fed to the fuel flowing chamber 3 via fuel feeding pipe 7. The mixture gas 12 is partially burned, and a high temperature fuel gas including non burned-up gas, is simultaneously obtained. The mixture gas 12 fed to the fuel flowing chamber 3 via the fuel feeding pipe 6 is obtained by mixing fuel such as a hydrocarbon with steam at a predetermined ratio. It is possible to set the mixing timing before fuel and steam are fed into the fuel feeding pipe 6 or when both fuel and steam are fed into the fuel feeding pipe 6 from predetermined places of the pipe 6.

Further, steam 14 is fed into the cooling jacket 4 via the cooling medium feeding pipe 8. The steam 14 fed into the cooling jacket 4 cools the cylindrical partitions 2 exposed to the high temperature fuel gas to be reformed, from the outside of the partitions 2. After cooling the cylindrical partitions 2, the steam 14 fed into the cooling jacket 4 is injected from a plurality of injection holes 9 into the fuel flowing chamber 3, and is mixed with the high temperature fuel gas generated by burning the mixture gas. With the heat of burning fuel and the steam 14, the reaction shown in the following equation (1) occurs, and the fuel gas is reformed so as to include hydrogen. The reaction is called a steam reforming reaction, and the reaction is an endothermic reaction, in which the mixture of hydrocarbon and the steam is changed to gas including hydrogen.

The reaction equation (1) is:

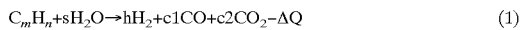

$$C_mH_n + sH_2O \rightarrow hH_2 + c1CO + c2CO_2 - \Delta Q \qquad (1)$$

where, $C_mH_n$ is hydrocarbon contained in heavy oil, s, h, c1 and c2 are coefficients, and $\Delta Q$ is the reaction heat.

This gas, including hydrogen, obtained by the above-mentioned process is fed to the combustor 28 from the fuel exit 10.

As mentioned above, in the fuel reformer of the embodiment, the cooling jacket 4 is arranged so as to surround the fuel flowing chamber 3 formed with the cylindrical partitions 2, and the steam 14 is fed into the cooling jacket 4 to cool the partitions 2 so that the partitions 2 are cooled from their outside. Therefore, the partitions 2, heated to a high temperature by the high temperature fuel gas, are protected by the above-mentioned cooling method. Thus, the high temperature heat-proofing reliability of the fuel reformer 29 is improved in this embodiment. That is, since the second chamber in which the cooling jacket 4 is provided, cools the fuel flowing chamber 3 from its outside by feeding the steam 14 as cooling medium into the cooling jacket 4, the fuel flowing chamber 3 exposed to the high temperature fuel gas is protected from damage by the high temperature fuel gas. Further, after cooling the partitions 2 of the fuel flowing chamber 3, the temperature of the steam 14 is increased to a temperature adequate for the reforming fuel, and is mixed with the fuel gas to be reformed. Furthermore, the fuel gas mixed with the heated steam 14 is reformed with the heat generated by partially oxidizing (combustion) more than 20% of the source fuel.

Moreover, since a diffused combustion method is used, the mixture gas fed from the fuel feeding pipe 6 and the air 13 fed from the air feeding pipe 7 are ignited. That is, the combustion range in the fuel concentration can be made so wide that fuel can be burned in its combustible range, since by feeding the mixture gas 12 (fuel) and the air 13 separately, it is possible to adjust the amounts of air and fuel to be fed, respectively. Thus, by adopting the diffused combustion method, it is possible to ignite the fuel mixture gas, due to the widened combustible range of the fuel.

Although the mixture of source fuel and steam is fed to the reformer through the pipe 12 in the above-mentioned embodiment, it is also effective to feed the mixture of source fuel and steam through the pipe 8, and to feed only fuel through the pipe 12 and mix it with air fed through the pipe 7, which is burned for generating a fuel reforming reaction heat source.

After ignition, since it is possible to keep fuel combustion in the fuel flowing chamber 3 with the combustion heat generated by the ignition, the reliability of fuel reforming in the fuel flowing chamber 3 of the fuel reformer 29 is improved. The fuel flowing chamber 3 is formed by the first cylindrical partition 2a and the second cylindrical partition 2b having different diameters, respectively. Diameter Da of the first cylindrical partition 2a is smaller than diameter Db of the second cylindrical partition 2b. The cylindrical partitions having the different diameters, respectively are overlapped at their neighboring inner end or parts. Since a gap is formed between the two overlapped terminal parts of the two cylindrical partitions 2a and 2b having the different diameters, respectively, a resilient spacer 5, of which a sectional view is a S character shape, is inserted into the gap so as to elastically support the two cylindrical partitions having the different diameters. As to sizes of the diameters, for example, Da and Db are set to 350 mm and 370 mm, respectively and the gap is set to about 10 mm. The spacer 5 is usually called a spring seal, and in the case where the cylindrical partitions having different diameters, respectively, are overlapped, fluid is prevented from leaking out of the gap formed between the two overlapped parts by line contacts in the circumferential direction formed by the spacer 5. The spacer is machined so as to have slit type cuts in the central axis direction which provides elasticity, and is called a flared seal. Since the cylindrical partitions 2 are cooled from their outsides by steam 14 and heated from their insides by the high temperature fuel gas to be reformed, both expansion and contraction strains act on the partitions 2. Accordingly, in order to absorb the expansion and the contraction, the fuel flowing chamber 3 is formed by the first partition 2a and the second partition 2b having different diameters, whereby an allowance for the simultaneously occurring expansion and contraction is available for the partitions 2. The above-mentioned structure comprising the fuel flowing chamber 3 can prevent a strength degradation of itself, and does not have a bad effect on other members of the fuel reformer 29, thereby improving the lifetime of the components of the fuel reformer 29. Thus, the reliability in heat-proofing of the fuel reformer 29 is improved. Moreover, since the fuel flowing chamber 3 possesses a plurality of fuel flowing serial sub-chambers having different diameters, thermal strain changes due to the expansion and contraction occurring in the members composing the plurality of fuel flowing sub-chambers caused by changes of the amount of the exhaust gas or the generated heat is also suppressed by adjusting the amounts of the fed fuel and the fed steam.

In the following, operation of the waste-to-energy incineration system using the above-mentioned fuel reformer is described. With feed-water led through a feed water pipe 21 from the steam turbine system, steam is obtained by heat exchange in the incinerator boiler 23 by using the burned-up waste gas 20 generated by burning waste 16 with air 18 pushed into the incinerator 19 by the compressor fan 17. Dust, NOx, etc. included in the exhaust gas output from the incinerator 19 are removed by the dust collector 26, and a part or the whole of the cleaned-up exhaust gas is extracted from a gas stream after the dust collector 26. The extracted exhaust gas is led to the combustor 28, and is used for air. The rest of the exhaust gas is discharged from the exhaust stack 25 to the atmosphere by the induction fan 27.

The exhaust gas system is also utilized to superheat steam generated in the incinerator boiler 23, with exhaust gas generated by burning the fuel gas. The mixture gas is obtained by mixing gas or mist fed from the fuel feeding pipe 6, which is gained from an evaporated heavy oil as the source fuel, with air fed from the air feeding apparatus 38. By using the mixture gas, gas including hydrogen is obtained by reforming fuel gas gained by partially oxidizing more than 20% of the source fuel (partial combustion) with steam extracted from the steam turbine 34 and fed into the fuel reformer 29. Further, in the combustor 28, the exhaust gas 39 extracted from the gas flow after the dust collector 26, is burned with the gas including hydrogen, obtained in the fuel reformer 29. In the process, the system is composed so that the exhaust gas 39 resides for more than 1 second under the condition of a temperature higher than 700° C., so that dioxin in the exhaust gas 39 is decomposed, and the exhaust gas 39 which is passed through the superheater 31, is discharged to the atmosphere. In this embodiment, the combustion performance of the combustor 28 is improved by using the gas reformed by the fuel reformer 29. Thus, the fuel gas improved in combustibility by reforming fuel, helps the incinerator exhaust gas to burn completely at a high temperature for a predetermined time so as to decompose completely the dioxin in the incinerator exhaust gas. Furthermore, the burned-up exhaust gas generated in combustor 28 is also used as a superheating heat source for the superheater 31 in which steam generated in the incinerator boiler 23 is superheated.

In the steam turbine system, the steam turbine 34 is driven by the steam superheated in the superheater 31, and the generator 35 driven by the steam turbine 34 generates power. The steam which has driven the steam turbine 34 is condensed into water in the condenser 36 and the condensed water is fed to and utilized in the incinerator 19.

Further, in this embodiment, Dioxin included in the exhaust gas is decomposed. Further, the cleaned-up exhaust gas is passed through the superheater 31, and increases the temperature of the about saturated steam of 300° C. at the pressure of 30 ata, which is generated in the incinerator boiler 23, to about 500° C. Since the heat difference between the superheated steam and the condensed water is expanded by the above-mentioned steam superheating process, a high efficiency of the power generation system can be realized by increasing the output power and the efficiency of the steam turbine.

Furthermore, since an additional heat source and an apparatus generating the heat source can be omitted by using the steam extracted from the steam turbine 34 as the steam for reforming fuel in the fuel reformer 29, a waste-to-energy incineration system realizing a high reliability can be provided.

Further, it is possible to compose the system so that the burned-up waste exhaust gas which has passed through the dust collector 26 is led to the combustor 28 through the superheater 31. In accordance with this composition of the system, the system can be operated with a low fuel consumption.

Furthermore, since the burned-up waste exhaust gas from which corrosive components are removed can be fed to the combustor 28 by connecting the combustor 28 to the downstream side of the dust collector 26, setting of the burning temperature in the combustor 28 becomes more flexible. Thus it is possible to perform burning of the reformed fuel at a higher temperature than 700° C., while still ensuring the soundness of members composing the combustor 28. Therefore, the plant can be operated with a high efficiency while ensuring the soundness of the plant.

Figure 3:
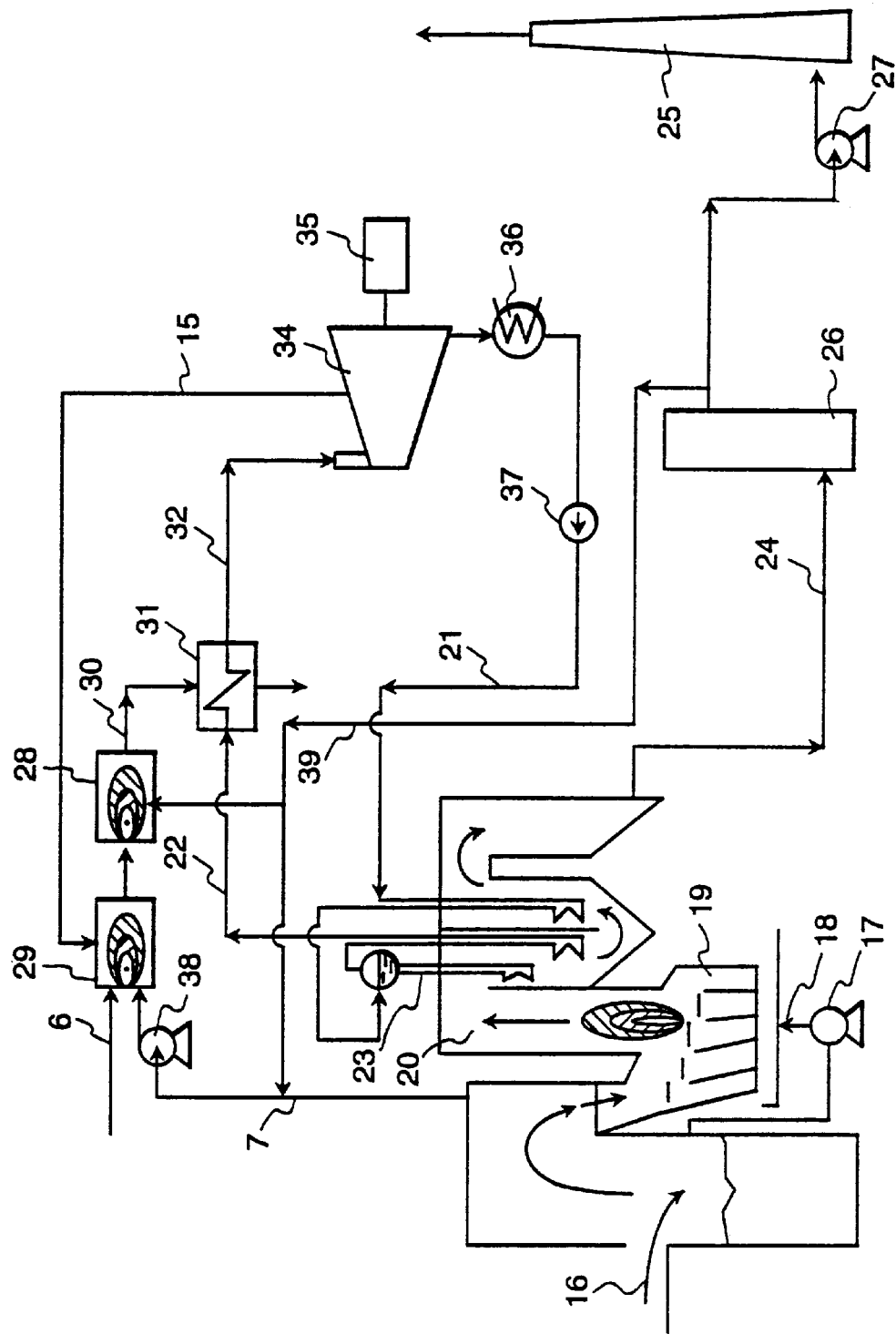
FIG. 3 is a variation of the system shown in FIG. 1.

FIG. 3 is a variation of the embodiment shown in FIG. 1, in which a part of the exhaust gas fed to the combustor 28 is injected into the air feeding pipe 7 for feeding air, so as to be fed to the fuel reformer 29.

The above-mentioned construction has an effect of contributing to the improvement of the efficiency of the fuel reformer 29 since the temperature of air can be increased by using the exhaust gas.

Figure 4:
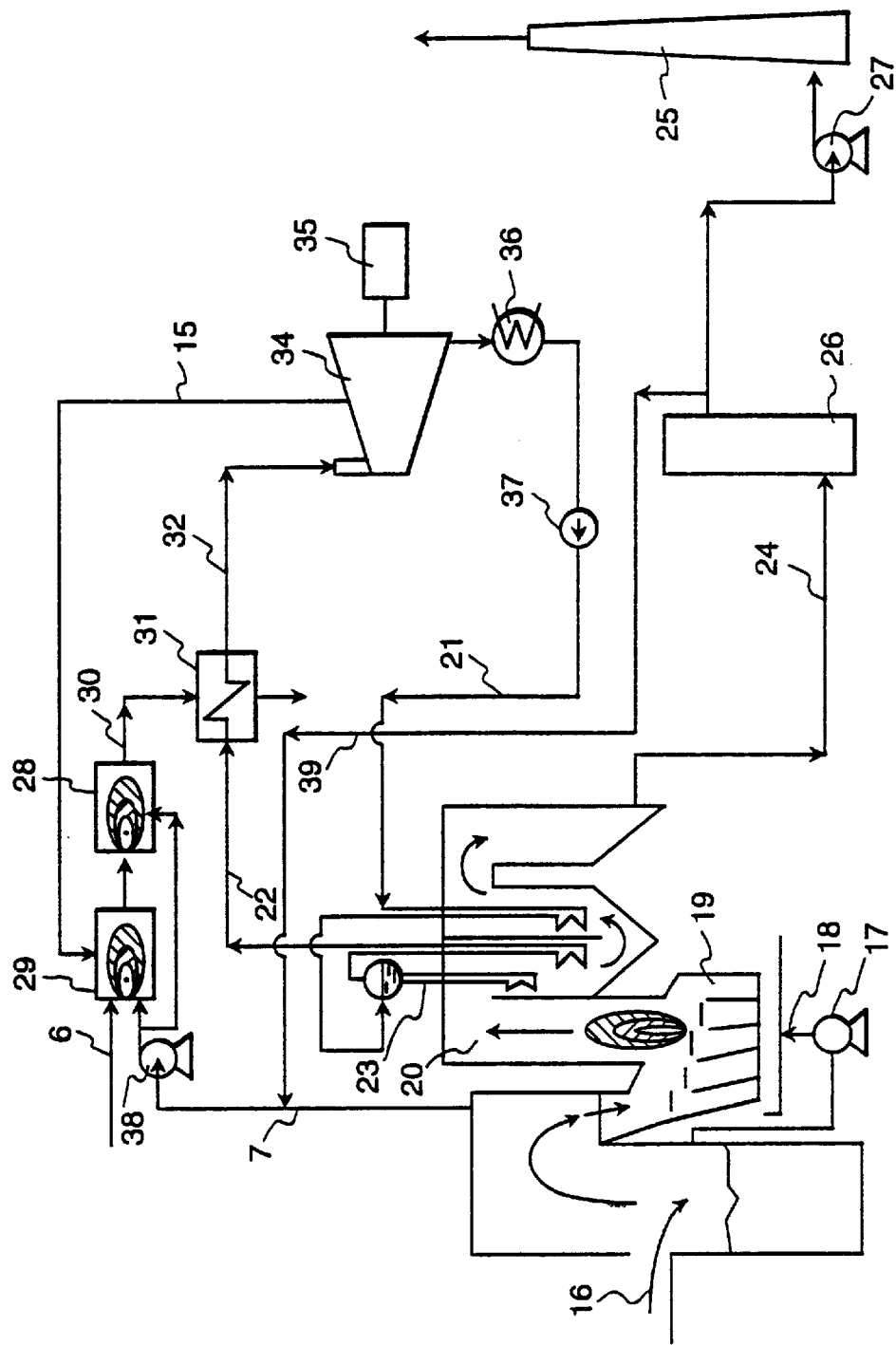
FIG. 4 is another variation of the system shown in FIG. 1.

FIG. 4 is another variation of the embodiment shown in FIG. 1, in which the incinerator exhaust gas 39 is injected into the air feeding pipe 7 for feeding air to the fuel reformer 29. Further, an air stream is branched after the air feeding apparatus 38, and one of the branches is fed to the reformer 29 and the other to the combustor 28.

By using the above-mentioned construction, it is possible to adjust the respective flow rates of the mixture gas of air and exhaust gas fed to the fuel reformer 29 and the combustor 28, corresponding to the mixture gas flow rate needed in each of the fuel reformer 29 and the combustor 28. Therefore, this construction has also an effect of contributing to realization of a high reliable waste-to-energy incineration system in which fuel is stably burned and reformed even at states of a low amount of the exhaust gas or an extremely low oxygen concentration of the exhaust gas. Furthermore, since the stable temperature necessary to decompose dioxin can be kept, even at a state of an extremely low oxygen concentration of the exhaust gas, by mixing the exhaust gas fed to the combustor 28 with air, it becomes possible to realize a highly efficient waste-to-energy incineration system having an excellent dioxin decomposing function.

Figure 5:
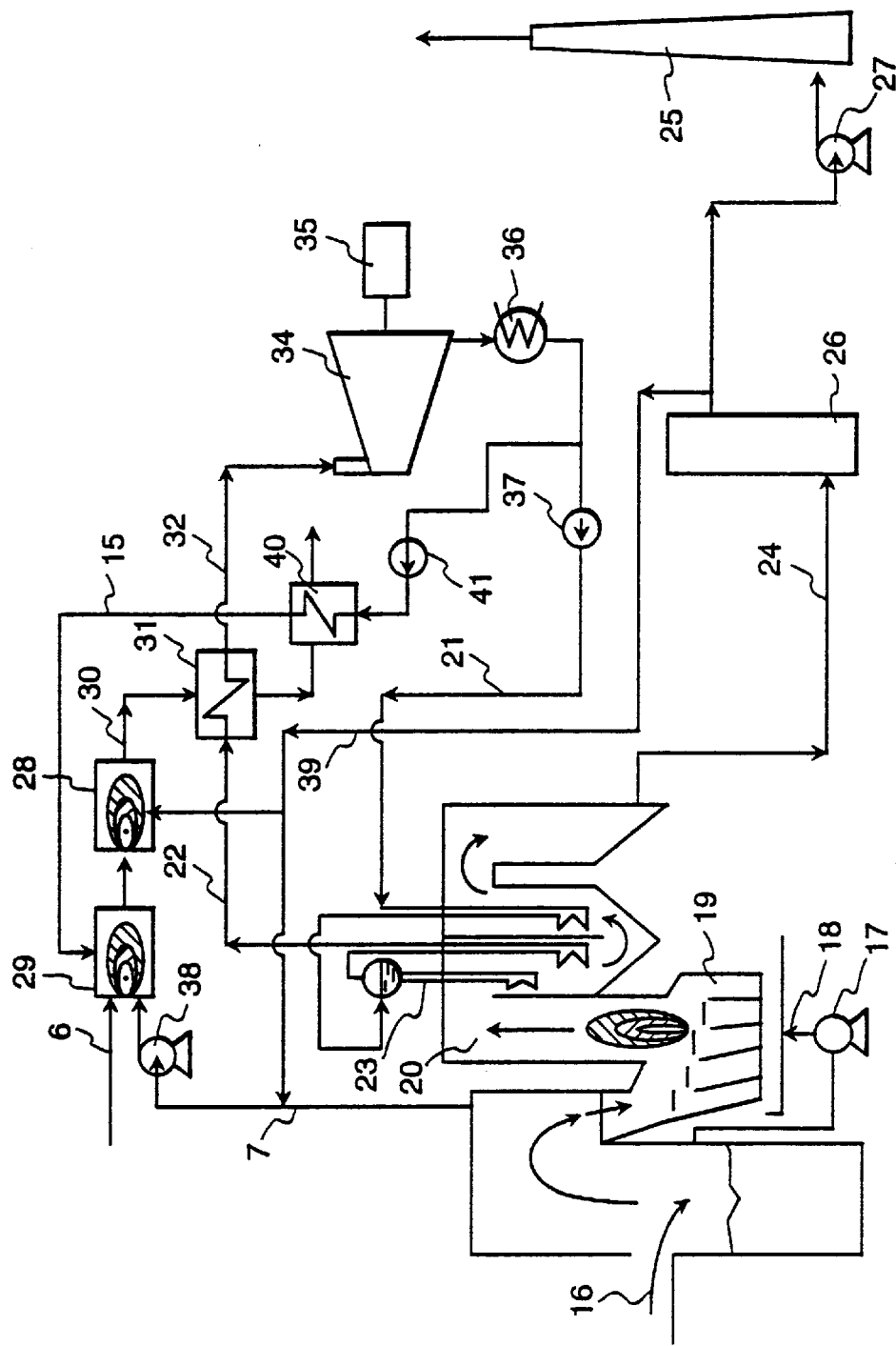
FIG. 5 is a system diagram of a waste-to-energy incineration system of another embodiment of the present invention.

In the following, other embodiments of the present invention are explained by referring to FIGS. 5–7. FIG. 5 shows a construction of a waste-to-energy incineration system of another embodiment, and FIG. 6 shows a construction of one variation of the embodiment shown in FIG. 5.

As shown in FIG. 5, in the waste-to-energy incineration system of this embodiment, the steam fed to the fuel reformer 29 is not extracted from the steam flowing in the steam turbine 34, but steam obtained by exchanging heat of the exhaust gas which passed through the superheater 31, with a part of the condensed water, in a feed water evaporator 40, and fed to the fuel reformer 29. That is, in this embodiment, water fed by a feed water pump 41 is evaporated during passage through the feed water evaporator 40, and fed into the fuel reformer 29.

The above-mentioned construction has an effect of contributing to improvement of fuel and to realization of a highly efficient waste-to-energy incineration system, since it is possible to feed steam to the fuel reformer 29 without decreasing the output of the steam turbine 34 due to steam extraction from steam flowing in the steam turbine 34. Further, it is possible to feed steam to the fuel reformer 29 under the optimal conditions of temperature and pressure because of independency from any constraint as to steam extraction.

Figure 6:
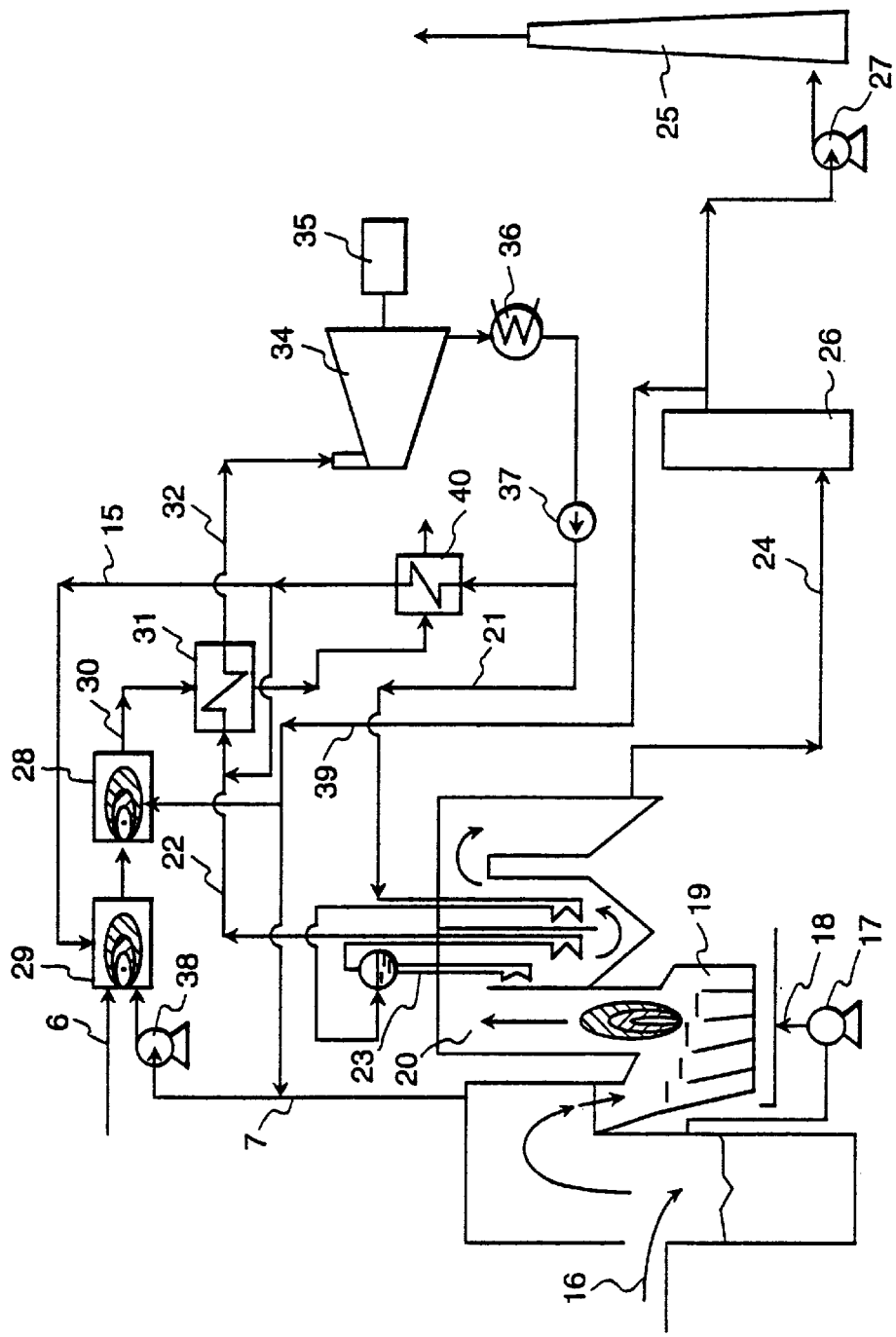
FIG. 6 is a variation of the system shown in FIG. 5.

FIG. 6 shows a variation of the embodiment shown in FIG. 5, in which a part of feed water flow branched at the feeding water flow after the feed water pump 37, is led to the feed water evaporator 40. The feed water flow passing through the feed water evaporator 40 is changed to a steam flow, and the steam flow is branched into two steam flows. One of the steam flows is mixed with the steam from the incinerator boiler 23, and the other one is fed to the fuel reformer 29. A heat source of the feed water evaporator 40 is the exhaust gas flowing after the superheater 31, and the heat in the exhaust gas is recovered by the feed water 40.

By using the above-mentioned construction, a highly efficient waste-to-energy incineration system is realized since the steam flow rate driving the steam turbine 34 can be increased by generating steam fed to the superheater 31 with the exhaust gas output from the combustor 28. Further, a more highly efficient waste-to-energy incineration system is realized since the output power is increased by increasing the steam fed to the fuel reformer 29 by using the evaporated feed water, in addition to the increase of steam flowing in the steam turbine 34.

Another embodiment of the present invention is explained by referring to FIG. 7 as follows. FIG. 7 shows a system diagram of a waste-to-energy incineration system of this embodiment.

Figure 7:
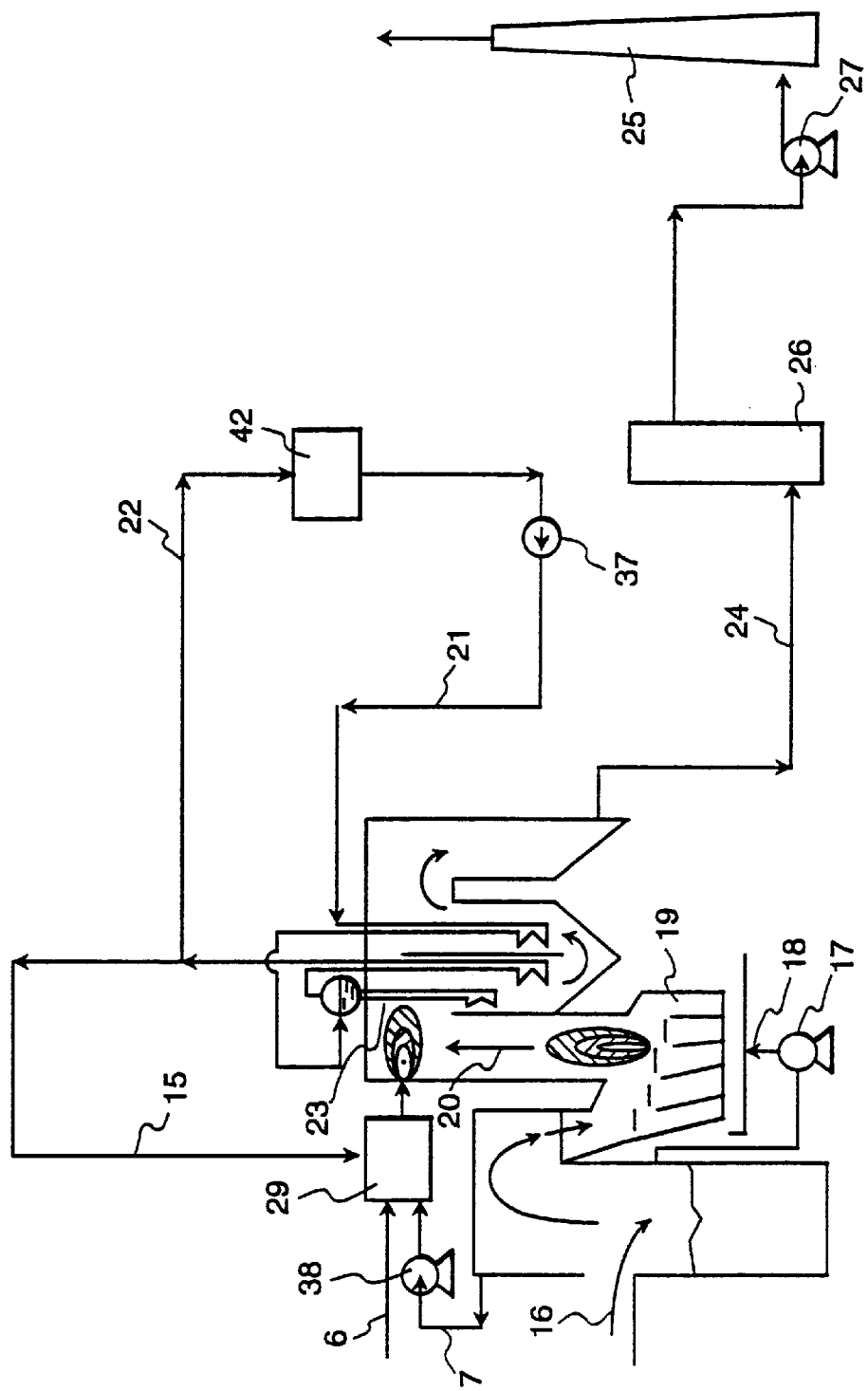
FIG. 7 is a system diagram of a waste-to-energy incineration system of still another embodiment of the present invention.

As shown in FIG. 7, fuel gas output from the fuel reformer 29 is injected into the incinerator 19, and a second fuel burning is performed in the incinerator 19. Further, differently from the embodiments shown in FIGS. 1–6, gas exhausted from the incinerator 19 is not fed to the fuel reformer 29, and is discharged from the exhaust stack 25 via the dust collector 26 and the induction fan 27. Moreover, a steam system is composed of the incinerator boiler 23, a steam utilizer 42 (a steam turbine, a cooler utilizing system, a warm water swimming pool, etc.) and a feed water pump 37. Further, steam is extracted from a place in the steam system and fed to the fuel reformer 29.

By using the above-mentioned construction, since it is possible to make an elongated, enlarged region of the high temperature at which dioxin can be decomposed in the incinerator 19, which also makes the resident time of the exhaust gas in the above-mentioned high temperature region long, the temperature and time necessary to decompose dioxin is assured. Thus, a highly efficient waste-to-energy incineration system having an excellent dioxin decomposing function can be realized. Moreover, since the high temperature burning-up region is enlarged and elongated, the time necessary for the exhaust gas to pass the high temperature region becomes longer. If the resident time increases, dioxin decomposition reaction exponentially progresses. A waste processing system having an incinerator capable of greatly reducing dioxin can be provided. Thus, by utilizing this embodiment, it is possible to provide a waste incinerator or a waste-to-energy incineration system discharging little hazardous material to the environment.

FIG. 8 illustrates another example of a fuel reformer 29 and a combustor 28.

Inside the fuel reformer 29, a fuel reforming chamber 3 (fuel flowing path) is formed, and at one end of the fuel reformer 29, a burner 52 for feeding fuel and air is provided. As the fuel, ordinary fuel such as petroleum can be used. Further, a cooling jacket 4 to which a mixture of source fuel and steam is fed from a cooling medium feeding pipe 8 through a cylindrical partition 2, is provided peripherally outside the fuel reforming chamber 3. As the source fuel, ordinary fuel such as heavy oil can be used. It is preferable to heat the source fuel in advance. At the cylindrical partition 2, a plurality of injection holes 9 are formed to inject the mixture fed to the cooling jacket 4 into the fuel reforming chamber 3. Moreover, an insulator layer 1 covers the cooling jacket 4 and directly a part of the fuel reforming chamber 3 as shown in FIG. 8.

The fuel and air fed from the burner 52 is ignited by an ignitor (not shown) and burned. Thus, a gas having a high temperature of 1300° C. for example, is generated. The mixture of source fuel and steam is injected from the plurality of injection holes 9 into the high temperature gas, and changed to reformed fuel gas including hydrogen gas $H_2$. If the source fuel includes hydrogen, the source fuel is changed to reformed fuel gas including much hydrogen. The reformed fuel gas is fed to the combustor 28 through a reformed fuel discharge exit 10.

The combustor 28 is composed of a combustion chamber 54 and an exhaust gas distributing chamber 55 provided outside the combustion chamber 54, which are separated from each other by a partition wall 50. Further, a plurality of exhaust gas injection holes 51, of which the injection direction is set inclined in the tangential direction of the partition wall 50, are formed in the partition wall 50. That is, the axis of each of the exhaust gas injection holes 51 has an angle other than a right-angle, toward the central axis of the partition wall 50. Moreover, the injection holes 51 are arranged on the whole peripheral surface of the partition wall 50 as shown in FIG. 8. It is desirable to control the flow of the burned-up waste exhaust gas sent from the incinerator so that the flow of the waste gas has a component of a tangential direction flow, and the waste exhaust gas is uniformly swirled in the exhaust gas distributing chamber 55 and injected into the combustion chamber 54. Furthermore, a nozzle 53 for swirling and injecting the reformed fuel gas fed from the fuel reformer 29 and an ignitor for igniting the reformed gas at a start-up of the combustor 28 are provided at the entrance of the combustor 54.

The reformed fuel gas including hydrogen, which is generated in the fuel reformer 29, is injected from the nozzle 53 into the combustion chamber 54, further ignited by the ignitor and burned with an oxidizing agent of the injected exhaust gas. Since the exhaust gas is thoroughly mixed with the burned fuel gas having a high temperature, and discharged from the combustor 28 after a sufficient time of the exhaust gas in the combustor 28, adequate removal of dioxin in the exhaust gas and reduction of Nox in the combustion discharge gas discharged from the combustor 28 can be affected.

Further, mixing of the burned fuel gas and the injected exhaust gas is promoted, and the temperature of the exhaust gas quickly reaches the temperature necessary for the decomposition of dioxin, by swirling and injecting the exhaust gas into the combustion chamber 54, inside of which the reformed fuel is burned. Thus, the time for which the exhaust gas stays at a high temperature region in the combustion chamber 54 is elongated, and it becomes easier to secure a sufficient time of the exhaust gas in the high temperature region in the combustion chamber 54, necessary for the decomposition of dioxin.

In the following, another embodiment will be explained with reference to FIG. 9.

Although this embodiment is fundamentally similar to the embodiment of FIG. 1, in this embodiment, water is fed from a feed water tank 51 to a boiler 23 through a pump 37, and steam generated by heat exchange in a waste incinerator 19 is fed to a steam utilizer. For example, the generated steam is fed to the fuel reformer 29 as the steam utilizer. The burned-up waste exhaust gas which was cleaned by a dust collector 26 is fed to the combustor 28 after being heated by a heat exchange in superheater 31 to which the discharge gas from the combustor 28 is fed. Further, water or steam fed from a water/steam feeding apparatus 52 is heated to steam or superheated steam by heat exchange in the superheater 31, and the steam is fed to the fuel reformer 29.

Figure 9:
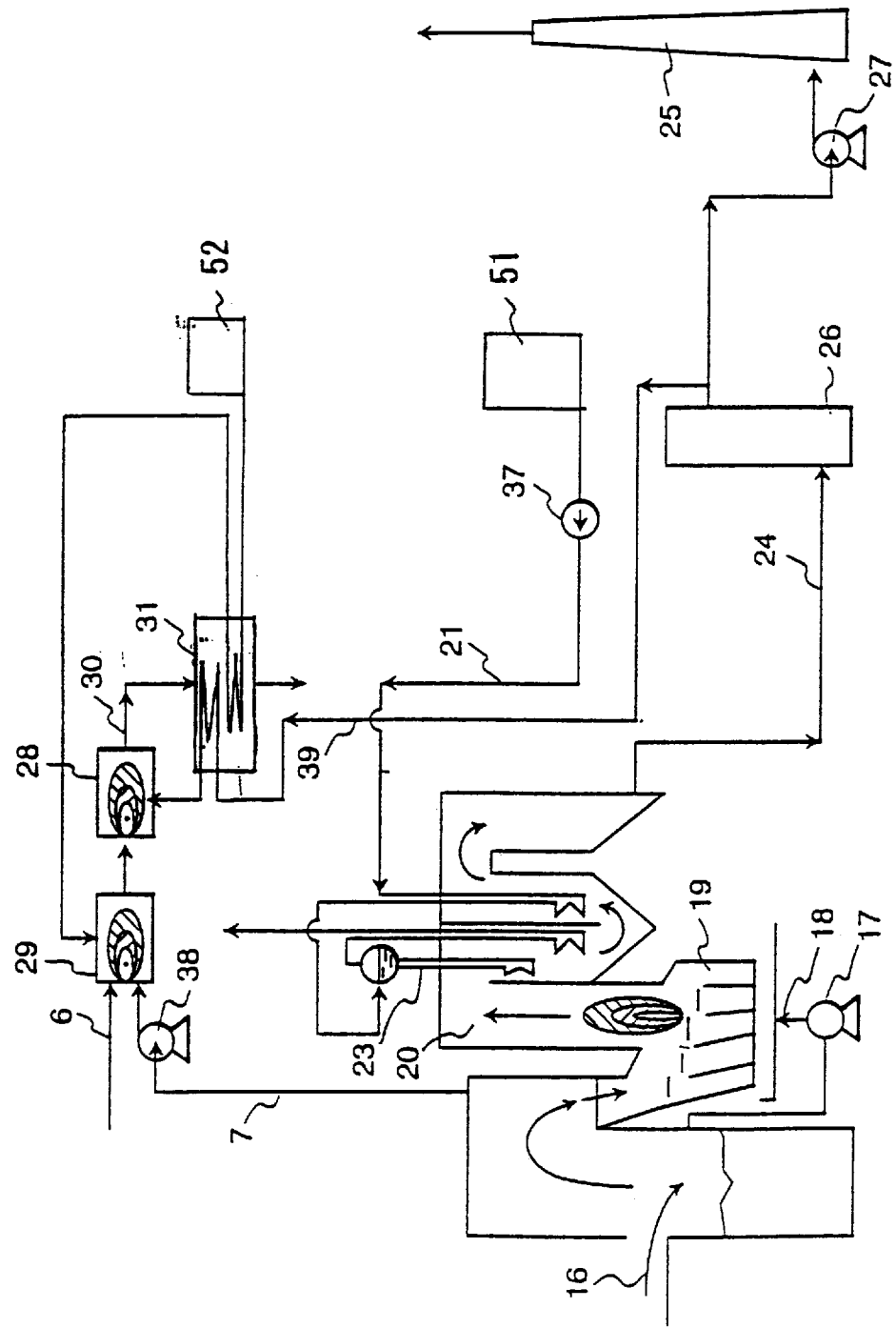
FIG. 9 is a block diagram showing a construction of a waste-to-energy incineration system of another embodiment of the present invention.

Another embodiment also is shown in FIG. 9.

This embodiment is fundamentally similar to the above-mentioned embodiment. In this embodiment, water fed from the water/steam feeding apparatus 52 passes through the superheater 31 and is heated to steam. Further, the generated steam is fed to the fuel reformer 29. When occasion demands, it is preferable that fuel to be fed to the fuel reformer is flowed through the superheater 31, and the heated fuel is fed to the fuel reformer 29.

The burned-up waste exhaust gas including low concentration oxygen, which is discharged from the waste incinerator 19, is heated by the superheater 31 and fed to the combustor 28. The combustion discharge gas which is cleaned in the combustor 28 is fed to the superheater 31 through a combustion discharge gas pipe 30, and the heat in the combustion discharge gas is used and cooled in the superheater 31, and then discharged to the air.

A source fuel such as heavy oil is fed to the fuel reformer 29 through the fuel feeding pipe 6. As mentioned above, it is desirable to construct the system so that the source fuel is heated by the superheater 31 before the source fuel is injected into the fuel reformer 29. Air is fed to the fuel reformer 29 through an air feeding pipe 7. Further, water fed from the water/steam feeding apparatus 52 is heated to steam by the superheater 31, and is fed to the fuel reformer 29. If steam is fed from the water/steam feeding apparatus 52, the steam is further heated. In the combustor 28, the reformed fuel gas is burned with the burned-up waste exhaust gas including low concentration oxygen, for example, at 800° C.

Since the above-mentioned embodiments are applicable independently of the type of incinerator, a waste incineration processing system according to the embodiments is hardly affected by a change in the type of incinerator 19, and it becomes easier to maintain, modify, reconstruct, etc., the waste incinerator 19.

In the above-mentioned constructions, the following cleaning system can be added to an existing waste processing system, for example, composed of a waste incinerator 19, a dust collector 26 to which the burned-up waste exhaust gas is fed, and an exhaust gas stack 25. That is, the cleaning system includes a fuel reformer 29 for changing an ordinary source fuel such as heavy oil fed to the reformer 29 to a reformed fuel gas including hydrogen, a combustor 28 for burning the reformed fuel gas together with the burned-up waste exhaust gas injected into the combustor 28, passing through the dust collector 26, and a superheater 31 to which the combustion discharge gas is fed. The fuel reformer 29 and the combustor 28 shown in FIG. 8 are applicable to this system. Moreover, an apparatus for feeding the source fuel such as heavy oil can be installed in this system.

Further, as occasion demands, a cooling apparatus for decreasing the temperature of the exhaust gas is provided in an exhaust gas flow path downstream of the superheater 31. The superheater 31 includes a heating part for heating the exhaust gas fed to the combustor 28, and a heating part for heating steam to be fed to the fuel reformer 29 or a steam generator for generating steam to be fed to the fuel reformer 29, and further, preferably a heating part for heating the source fuel fed to the fuel reformer 29.

In accordance with the above-mention construction, the waste processing system is easily applied to an existing waste incinerator, which is friendly to the environment. In applying the embodiment to an existing incinerator, by modifying only an exhaust gas flow piping, a waste processing system of high cleaning efficiency can be constructed in a short time. Further, the heat generated in the above-mentioned system can be more effectively used by installing a steam turbine and a generator in the system as the steam utilizers.

As explained above, by using the present invention, since low heat valued fuel gas, included in the burned-up gas used for superheating steam generated in an incinerator boiler, can be generated by burning fuel gas obtained by reforming liquid fuel, so as to burn more than 20% of the source fuel, it is possible to form a stable high temperature burning field, namely, a dioxin decomposing field. Thus, it has become possible to provide a highly efficient and reliable waste-to-energy incineration system capable of almost completely reducing dioxin and efficiently recovering exhaust heat generated in the system.

What is claimed is:

1. A waste incineration processing system including a waste incinerator for burning waste, a dust collector for removing dust from waste exhaust gas exhausted from said waste incinerator, a fuel reformer for changing source fuel to reformed fuel including hydrogen, and a combustor for burning said reformed fuel fed from the reformer together with said waste exhaust gas fed from said dust collector, wherein said combustor includes an exhaust gas distributing chamber for introducing said waste exhaust gas from said dust collector, and a combustion chamber which is provided inside the exhaust gas distributing chamber via a partition wall, for burning said reformed gas fed from said fuel reformer and said waste exhaust gas fed from said dust collector and a plurality of gas injection holes being formed in said partition wall separating said exhaust gas distributing chamber and said combustion chamber.

2. A waste incineration processing system according to claim 1, wherein the injection direction of each said plurality of gas injection holes formed in said partition wall is inclined in the tangential direction of said partition wall so as to generate a swirling flow of said exhaust gas infected into said combustion chamber.

3. A waste incineration processing system according to claim 1, wherein said combustor includes a nozzle for swirling said reformed fuel fed from said fuel reformer and injecting said reformed fuel into said combustor, and an igniter for igniting said injected reformed fuel.

4. A waste incineration processing system comprising:

a dust collector for removing dust from waste exhaust gas exhausted from said waste incinerator;

a fuel reformer for changing source fuel to reformed fuel including hydrogen; and a combustor for burning said reformed fuel fed from the reformer together with said waste exhaust gas fed from said dust collector; wherein said combustor includes an exhaust gas distributing chamber for introducing said waste exhaust gas from said dust collector, and a combustion chamber which is provided inside the exhaust gas distributing chamber via a partition wall, for burning said reformed gas fed from the said fuel reformer and said waste exhaust gas fed from said dust collector, a plurality of gas injection holes being formed in said partition wall separating said exhaust gas distributing chamber and said combustion chamber.

5. A waste incineration processing system according to claim 4, further including a superheater for heating said waste exhaust gas to be fed to the combustor by using heat in combustion discharging gas discharged from the combustor as a heat source, said superheater being located downstream of said combustor.

* * * * *